US010548261B2

(12) United States Patent
Tomizawa et al.

(10) Patent No.: US 10,548,261 B2
(45) Date of Patent: Feb. 4, 2020

(54) GROWTH INFORMATION MANAGEMENT DEVICE, METHOD FOR CONTROLLING GROWTH INFORMATION MANAGEMENT DEVICE, AND GROWTH INFORMATION MANAGEMENT PROGRAM

(71) Applicant: Topcon Corporation, Itabashi-ku, Tokyo (JP)

(72) Inventors: Ryosuke Tomizawa, Tokyo (JP); Issei Hanya, Tokyo (JP); Shinkai Shu, Tokyo (JP)

(73) Assignee: Topcon Corporation, Itabashi-ku, Tokyo (JP)

( * ) Notice: Subject to any disclaimer, the term of this patent is extended or adjusted under 35 U.S.C. 154(b) by 92 days.

(21) Appl. No.: 15/705,404

(22) Filed: Sep. 15, 2017

(65) Prior Publication Data

US 2018/0077857 A1 Mar. 22, 2018

(30) Foreign Application Priority Data

Sep. 16, 2016 (JP) .................. 2016-181774

(51) Int. Cl.
*A01C 21/00* (2006.01)
*A01B 79/00* (2006.01)
*G06Q 50/02* (2012.01)

(52) U.S. Cl.
CPC .......... *A01C 21/005* (2013.01); *A01B 79/005* (2013.01); *G06Q 50/02* (2013.01)

(58) Field of Classification Search
CPC ..... A01C 21/005; G06Q 50/02; A01B 79/005
See application file for complete search history.

(56) References Cited

U.S. PATENT DOCUMENTS

| 6,606,542 B2* | 8/2003 | Hauwiller | A01B 79/005 111/200 |
| 9,113,590 B2* | 8/2015 | Johnson | A01G 22/00 |
| 9,652,840 B1* | 5/2017 | Shriver | G01N 33/0098 |
| 9,734,400 B2* | 8/2017 | Shriver | G01N 33/025 |
| 2012/0101784 A1* | 4/2012 | Lindores | A01B 79/005 703/2 |
| 2012/0298847 A1 | 11/2012 | Hayashi et al. | |
| 2015/0278966 A1* | 10/2015 | Johnson | G06Q 50/02 702/2 |

(Continued)

FOREIGN PATENT DOCUMENTS

JP 2012247235 A 12/2012

*Primary Examiner* — Frederick M Brushaber
(74) *Attorney, Agent, or Firm* — Chiesa Shahinian & Giantomasi PC

(57) ABSTRACT

A growth information management device and the like with which growth information acquired from a plurality of farm fields can be easily divided or processed in other like manners.

A growth information management device 10 generates boundary information on farm field information based on measured growth information 24 that is plant growth information that has been measured, generates independent farm field information 53 sectionalized based on the boundary information, and converts the measured growth information corresponding to the independent farm field information into growth level information 45 that is information indicating a level of growth of a plant and displays the growth level information on a display unit 16.

9 Claims, 15 Drawing Sheets

(56) References Cited

U.S. PATENT DOCUMENTS

| | | | | |
|---|---|---|---|---|
| 2015/0302305 A1* | 10/2015 | Rupp | ............... | A01B 79/005 706/46 |
| 2016/0078375 A1* | 3/2016 | Ethington | .......... | G06Q 10/0633 705/7.27 |
| 2016/0078570 A1* | 3/2016 | Ethington | .......... | G06Q 10/1097 705/7.21 |
| 2016/0180473 A1* | 6/2016 | Groeneveld | ........... | A01G 22/00 705/7.25 |
| 2017/0318743 A1* | 11/2017 | Sauder | ................ | B60K 35/00 |
| 2018/0035605 A1* | 2/2018 | Guan | ................... | A01G 22/00 |

\* cited by examiner

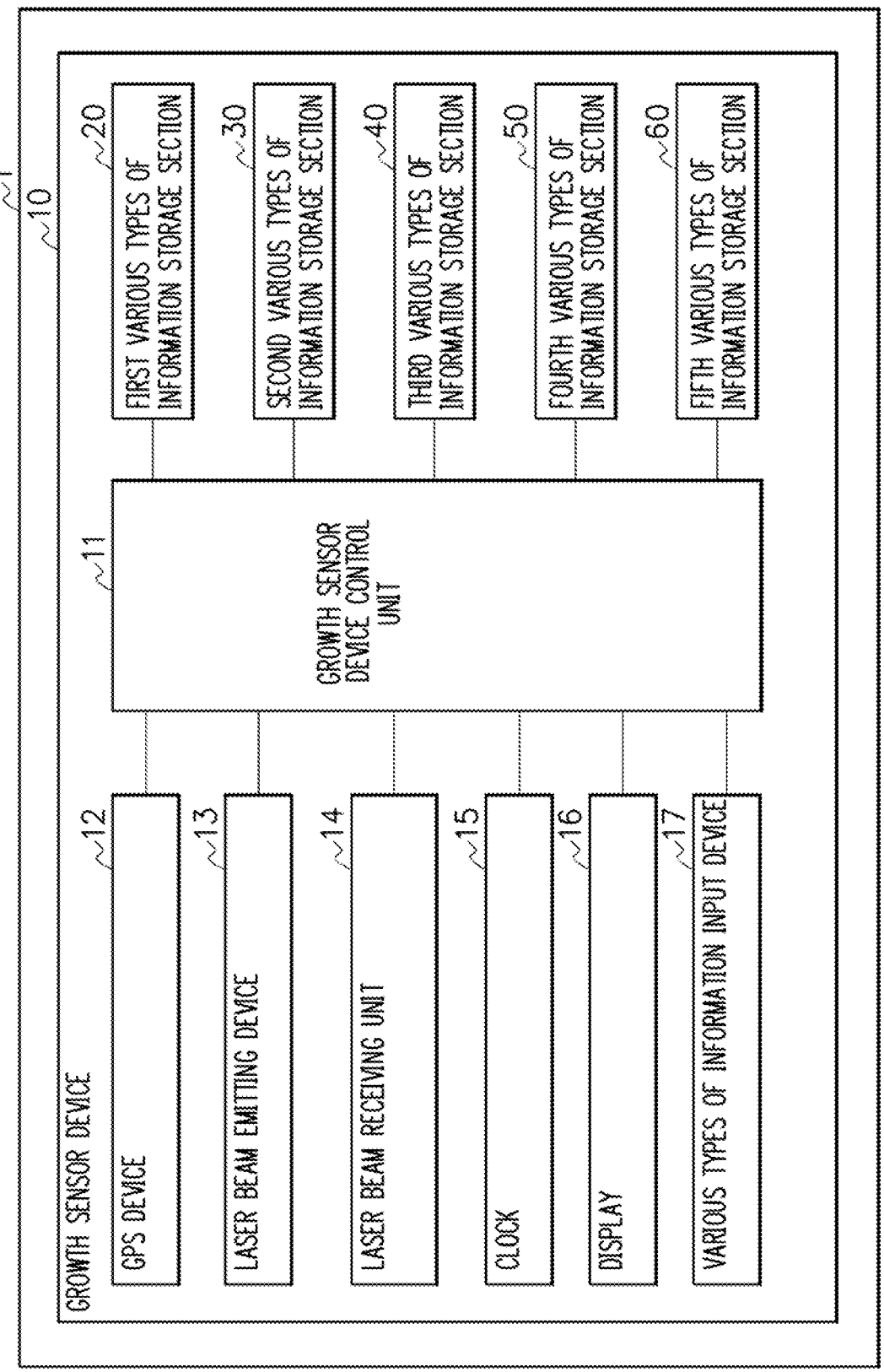
F I G. 1

FIG. 4

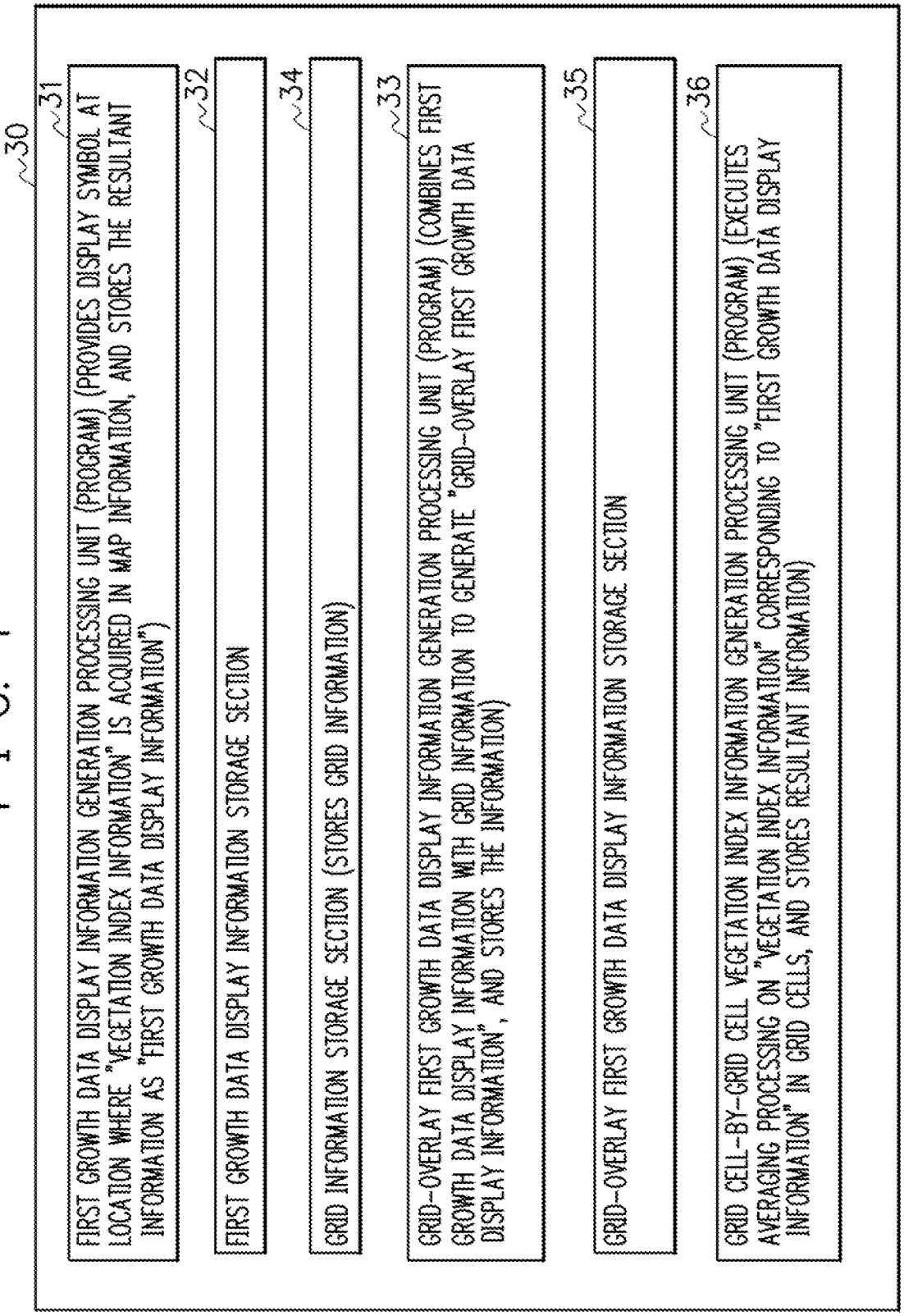

30
31 FIRST GROWTH DATA DISPLAY INFORMATION GENERATION PROCESSING UNIT (PROGRAM) (PROVIDES DISPLAY SYMBOL AT LOCATION WHERE "VEGETATION INDEX INFORMATION" IS ACQUIRED IN MAP INFORMATION, AND STORES THE RESULTANT INFORMATION AS "FIRST GROWTH DATA DISPLAY INFORMATION")
32 FIRST GROWTH DATA DISPLAY INFORMATION STORAGE SECTION
34 GRID INFORMATION STORAGE SECTION (STORES GRID INFORMATION)
33 GRID-OVERLAY FIRST GROWTH DATA DISPLAY INFORMATION GENERATION PROCESSING UNIT (PROGRAM) (COMBINES FIRST GROWTH DATA DISPLAY INFORMATION WITH GRID INFORMATION TO GENERATE "GRID-OVERLAY FIRST GROWTH DATA DISPLAY INFORMATION", AND STORES THE INFORMATION)
35 GRID-OVERLAY FIRST GROWTH DATA DISPLAY INFORMATION STORAGE SECTION
36 GRID CELL-BY-GRID CELL VEGETATION INDEX INFORMATION GENERATION PROCESSING UNIT (PROGRAM) (EXECUTES AVERAGING PROCESSING ON "VEGETATION INDEX INFORMATION" CORRESPONDING TO "FIRST GROWTH DATA DISPLAY INFORMATION" IN GRID CELLS, AND STORES RESULTANT INFORMATION)

F I G. 5

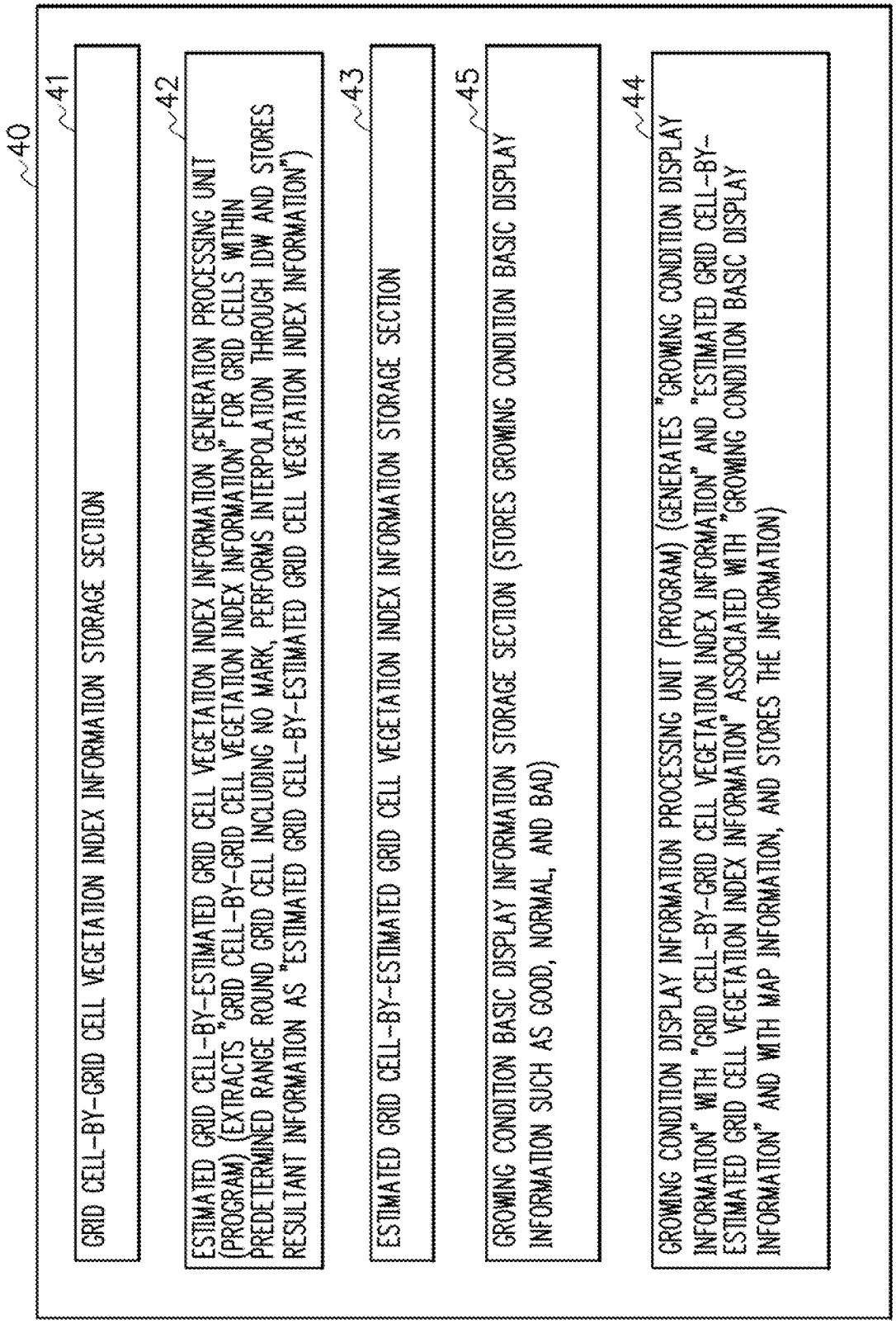

40
- 41 GRID CELL-BY-GRID CELL VEGETATION INDEX INFORMATION STORAGE SECTION
- 42 ESTIMATED GRID CELL-BY-ESTIMATED GRID CELL VEGETATION INDEX INFORMATION GENERATION PROCESSING UNIT (PROGRAM) (EXTRACTS "GRID CELL-BY-GRID CELL VEGETATION INDEX INFORMATION" FOR GRID CELLS WITHIN PREDETERMINED RANGE ROUND GRID CELL INCLUDING NO MARK, PERFORMS INTERPOLATION THROUGH IDW AND STORES RESULTANT INFORMATION AS "ESTIMATED GRID CELL-BY-ESTIMATED GRID CELL VEGETATION INDEX INFORMATION")
- 43 ESTIMATED GRID CELL-BY-ESTIMATED GRID CELL VEGETATION INDEX INFORMATION STORAGE SECTION
- 45 GROWING CONDITION BASIC DISPLAY INFORMATION STORAGE SECTION (STORES GROWING CONDITION BASIC DISPLAY INFORMATION SUCH AS GOOD, NORMAL, AND BAD)
- 44 GROWING CONDITION DISPLAY INFORMATION PROCESSING UNIT (PROGRAM) (GENERATES "GROWING CONDITION DISPLAY INFORMATION" WITH "GRID CELL-BY-GRID CELL VEGETATION INDEX INFORMATION" AND "ESTIMATED GRID CELL-BY-ESTIMATED GRID CELL VEGETATION INDEX INFORMATION" ASSOCIATED WITH "GROWING CONDITION BASIC DISPLAY INFORMATION" AND WITH MAP INFORMATION, AND STORES THE INFORMATION)

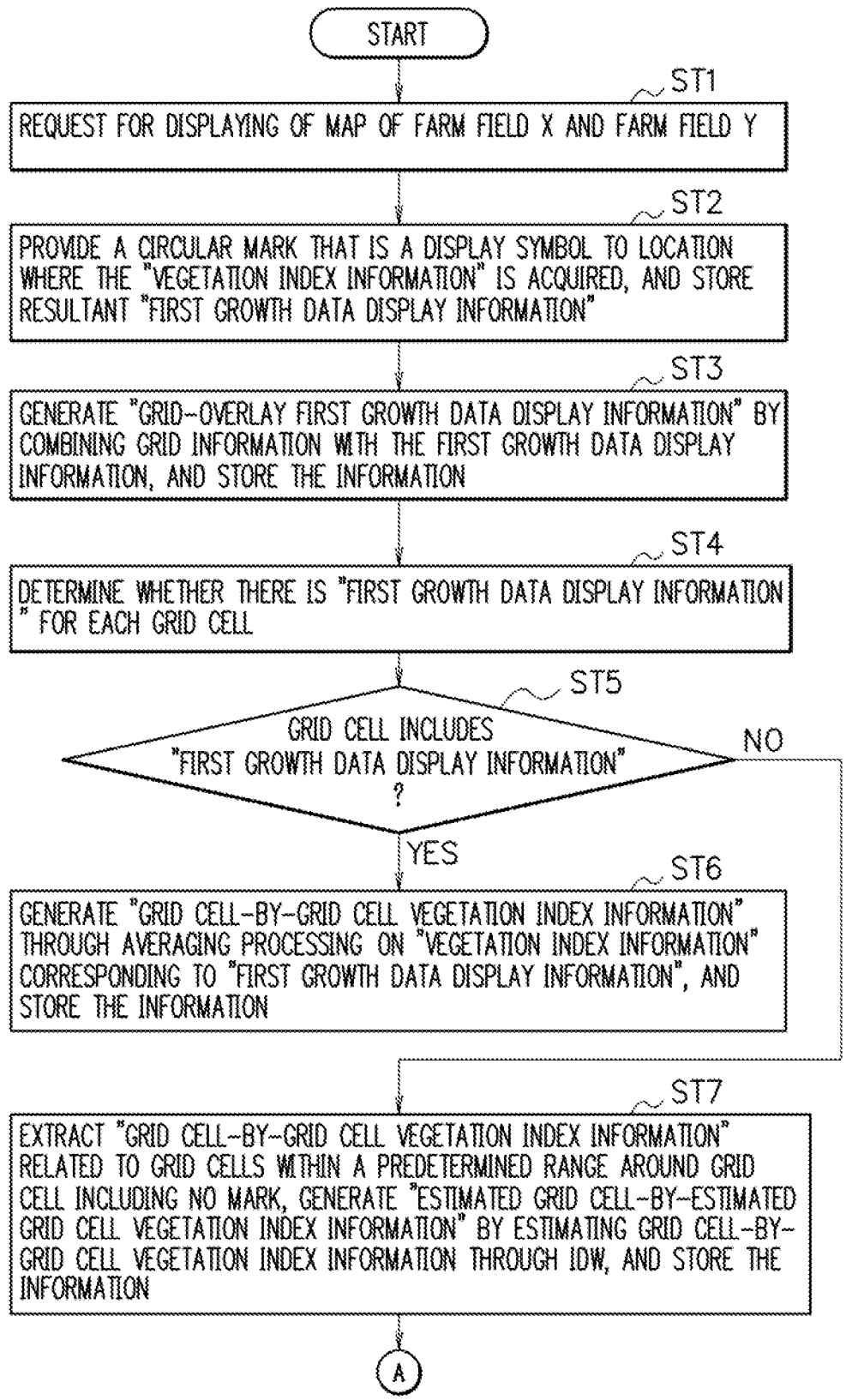

F I G. 9

(A)

ST8: GENERATE "GROWING CONDITION DISPLAY INFORMATION" BY ASSOCIATING "GRID CELL-BY-GRID CELL VEGETATION INDEX INFORMATION" AND "ESTIMATED GRID CELL-BY-ESTIMATED GRID CELL VEGETATION INDEX INFORMATION" WITH "GROWING CONDITION BASIC DISPLAY INFORMATION" AND WITH MAP INFORMATION, AND STORE INFORMATION

ST9: DETERMINE BOUNDARY OF FARM FIELD, LABEL AREA WITHIN BOUNDARY AS INDEPENDENT FARM FIELD, AND STORE THE AREA

ST10: DISPLAY INDEPENDENT FARM FIELD INFORMATION AND THE LIKE AS WELL AS MAP SELECTION SCREEN FOR CHOOSING AUTOMATIC SELECTION OR MANUAL SELECTION OF FARM FIELD AREA

ST11: AUTOMATIC SELECTION FOR FARM FIELD CHOSEN?  — NO → (C)

YES

ST12: STORE FARM FIELD SELECTED BY USER CLICKING ON SCREEN, AND STORE SELECTED FARM FIELD

ST13: OBTAIN "GRID CELL-BY-GRID CELL VEGETATION INDEX AVERAGE INFORMATION" AS AVERAGE VALUE OF "GRID CELL-BY-GRID CELL VEGETATION INDEX INFORMATION" AND "ESTIMATED GRID CELL-BY-ESTIMATED GRID CELL VEGETATION INDEX INFORMATION" ON ALL THE GRID CELLS IN SELECTED FARM FIELD, AND STORE THE INFORMATION

ST14: OBTAIN "STANDARDIZED GRID CELL-BY-GRID CELL VEGETATION INDEX INFORMATION" ON EACH GRID CELL, BY DIVIDING CURRENT "GRID CELL-BY-GRID CELL VEGETATION INDEX INFORMATION" AND CURRENT "ESTIMATED CELL-BY-ESTIMATED GRID CELL VEGETATION INDEX INFORMATION" ON EACH GRID CELL BY "GRID CELL-BY-GRID CELL VEGETATION INDEX AVERAGE INFORMATION", AND STORE THE INFORMATION

ST15: TAKE AVERAGE OF CURRENT "STANDARDIZED GRID CELL-BY-GRID CELL VEGETATION INDEX" AND PAST "STANDARDIZED GRID CELL-BY-GRID CELL VEGETATION INDEX" FOR EACH GRID CELL, AND STORE RESULTANT INFORMATION AS "STATISTICAL GRID CELL-BY-GRID CELL VEGETATION INDEX INFORMATION". THIS "STATISTICAL GRID CELL-BY-GRID CELL VEGETATION INDEX INFORMATION" IS STORED WHILE BEING ASSOCIATED WITH "GROWING CONDITION REFERENCE DISPLAY INFORMATION".

ST16: DISPLAY INFORMATION IN "STATISTICAL GROWING CONDITION DISPLAY INFORMATION STORAGE SECTION" ON DISPLAY IN RESPONSE TO REQUEST FROM USER FOR STATISTICAL INFORMATION (B)          (C)

F I G. 12
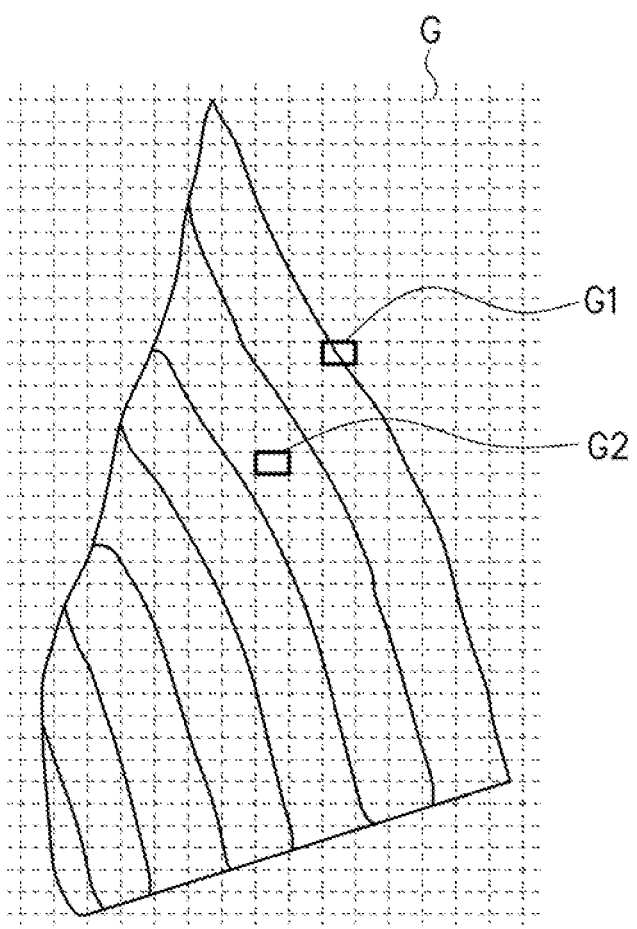

F I G. 13
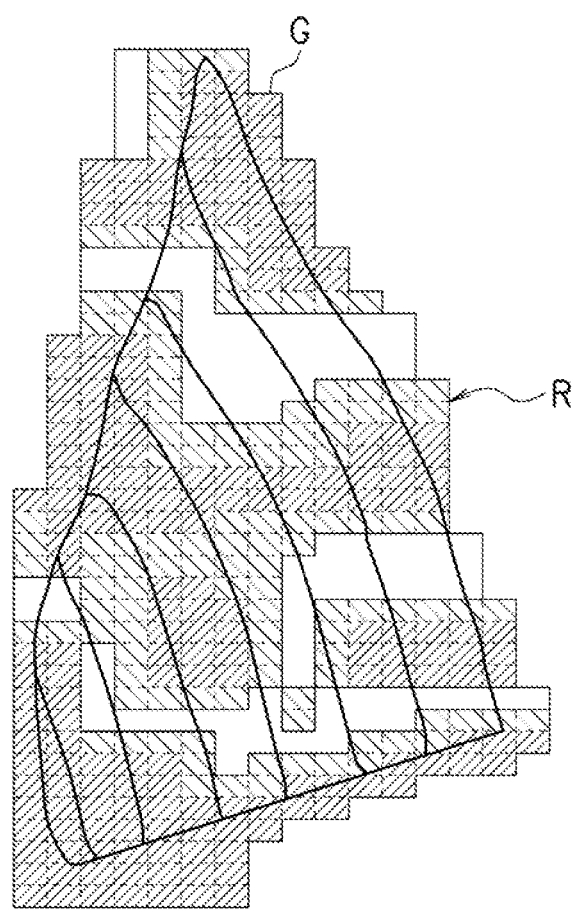

GROWTH INFORMATION MANAGEMENT DEVICE, METHOD FOR CONTROLLING GROWTH INFORMATION MANAGEMENT DEVICE, AND GROWTH INFORMATION MANAGEMENT PROGRAM

TECHNICAL FIELD

The present invention relates to a growth information management device, a method for controlling a growth information management device, and a growth information management program for managing information on a growing condition of plants and the like in a farm field.

BACKGROUND FIELD

Devices for collecting data on a growing condition of plants in a farm field for growing the plants such as crops have conventionally been proposed (for example, Patent Document 1).

CONVENTIONAL ART DOCUMENTS

Patent Document

[Patent Document 1] JP-A-2012-247235

SUMMARY OF INVENTION

Problem to be Solved by the Invention

For example, such a device forces a user owning a plurality of farm fields that has sequentially and collectively acquired data on the growing condition of the plants in his or her plurality of farm fields to perform cumbersome operations to distinguish data between the farm fields. To avoid such operations, growth data needs to be acquired with the farm fields distinguished from each other in advance.

Thus, an object of the present invention is to provide a growth information management device, a method for controlling a growth information management device, and a growth information management program with which growth information acquired from a plurality of farm fields and the like can be easily divided or processed in other like manners.

Means to Solve the Problem

The above-described object is achieved according to the present invention by a growth information management device comprising a display unit, in which boundary information on farm field information is generated based on measured growth information that is plant growth information that has been measured, independent farm field information sectionalized based on the boundary information is generated, and the measured growth information corresponding to the independent farm field information is converted into growth level information that is information indicating a level of growth of a plant and the growth level information is displayed on the display unit.

With this configuration, the measured growth information on a plurality of farm fields, acquired collectively with no distinction by a user, can be converted into data on each of the farm fields and into the growth level information, indicating good, normal, bad, and the like, to be displayed on the display unit. Thus, the user owning the plurality of farm field can automatically acquire the growth level information on each of the farm fields without managing the measured growth information for each of the farm fields. Thus, the information can be easily distinguished between the farm fields to be managed, and a fertilization plan can be easily created for each of the farm fields.

Preferably, the growth level information on the independent farm field information is statistical growth information reflecting the growth level information measured in past.

With this configuration, the growth level information not only includes the current data, but also reflects the past data, whereby a more accurate fertilization plan can be achieved by the user.

Preferably, the growth level information is determined far each of predetermined sections in the independent farm field.

With this configuration, the growth level information can be presented to a user on a region (having a predetermined area)-by-region basis instead of a point-by-point basis. Thus, useful information can be provided to the user.

Preferably, when the growth level information is unable to be generated due to absence of the measured growth information in one of the sections, the growth level information in the section is estimated based on information on ones of the sections disposed around the one section.

With this configuration, the growth level information can be generated for a section without the measured growth information, whereby the user can easily create a fertilization plan.

Preferably, the standardized growth information is generated only for a desired area in the independent farm field.

With this configuration, a desired area in the independent farm field is designated so that the standardized growth information can be generated for the desired area only to be presented to the user. Thus, the configuration offers high user-friendliness.

The above-described object is achieved accord in to the present invention by a method for controlling a growth information management device including generating boundary information on farm field information based on measured growth information that is plant growth information that has been measured, generating independent farm field information sectionalized based on the boundary information, and converting the measured growth information corresponding to the independent farm field information into growth level information that is information indicating a level of growth of a plant and displaying the growth level information on a display unit.

The above-described object is achieved according to the present invention by a growth information management program causing a growth information management device that manages measured growth information that is plant growth information that has been measured to execute: generating boundary information on farm field information based on the measured growth information, generating independent farm field information sectionalized based on the boundary information, and converting the measured growth information corresponding to the independent farm field information into growth level information that is information indicating a level of growth of a plant and displaying the growth level information on a display unit.

Advantageous Effects of the Invention

The present invention has the advantageous effect of providing a growth information management device, a method for controlling a growth information management device, and a growth information management program with which growth information acquired from a plurality of farm fields and the like can be easily divided or processed in other like manners.

BRIEF DESCRIPTION OF THE DRAWINGS

FIG. 1 is a schematic block diagram illustrating a main configuration of a tractor including a growth sensor device that is an example of a growth information management device according to the present invention.

FIG. 4 is a schematic block diagram illustrating main configurations of a second various types of information storage section.

FIG. 5 is a schematic block diagram illustrating main configurations of a third various types of information storage section.

FIG. 8 is a schematic flowchart illustrating a process of displaying a growing condition on a display and other like processes.

FIG. 9 is another schematic flowchart illustrating a process of displaying a growing condition on the display and other like processes.

FIG. 12 is a schematic view of "grid-overlay first growth data display information" obtained by combining grid information with the farm field X in FIG. 11, FIG. 13 is a schematic view of information obtained by adding "growth information display information" to a value of each grid cell in the farm field X in FIG. 12.

DESCRIPTION OF EMBODIMENTS

Preferred embodiments of the present invention are described in detail below with reference to the attached drawings. The embodiments described below are specific preferred examples of the present invention and thus include various technically suitable limitation. Still, the scope of the present invention is not limited to the embodiments unless otherwise stated in the description below.

FIG. 1 is a schematic block diagram illustrating a main configuration of a tractor 1 including a growth sensor device 10 that is an example of a growth information management device according to the present invention. As illustrated in FIG. 1, the growth sensor device 10 mounted in the tractor 1 includes a Global Positioning System (GPS) device 12. The GPS device 12 uses the GPS to be capable of acquiring positional information (longitude/latitude information) on the tractor 1. The growth sensor device 10 further includes a "laser beam emitting device 13" and a "laser beam receiving unit 14".

Figure 2:
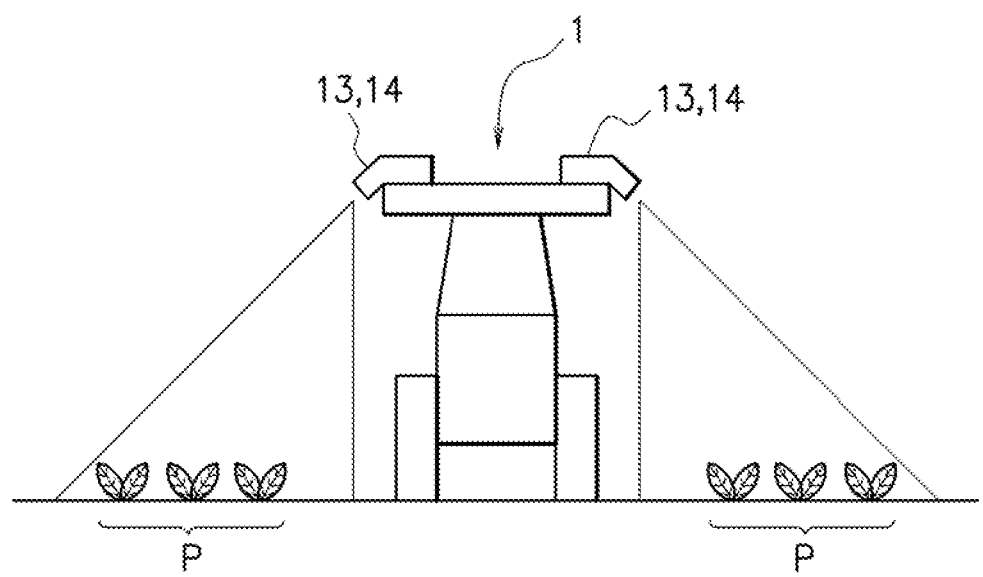
FIG. 2 is a schematic view illustrating a state where plants are irradiated with a laser beam emitted from a laser beam emitting device of the growth sensor device mounted in the tractor, and the resulting reflection light is received by a laser beam receiving unit.

Functions or the like of the "laser beam emitting device 13", the "laser beam receiving unit 14", and the like are described with reference to FIG. 2. FIG. 2 is a schematic view illustrating a state where plants P are irradiated with a laser beam emitted from the laser beam emitting device 13 of the growth sensor device 10 mounted in the tractor 1, and the resulting reflection light is received by the laser beam receiving unit 14.

The laser beam emitting device 13 illustrated in FIG. 1 can use a "first measurement light beam" and a "second measurement light beam" having different wavelengths. An example of the first measurement light beam includes a light beam in a red wavelength band, and an example of the second measurement light beam includes a light beam in an infrared wavelength band. The first measurement light beam and the second measurement light beam are emitted onto the same plant P as illustrated in FIG. 2. The reflection light is received by the laser beam receiving unit 14 illustrated in FIG. 1, whereby reflectance of the light beams is acquired. Thus, a growth status of the plant P, more specifically, the amount of nutrient contained in the plant P can be recognized. The amount of nutrient is normalized difference vegetation index (NDVI, hereinafter referred to as "vegetation index") information that is an example of measured growth information serving as plant growth information. The vegetation index information is described later.

The present embodiment relies on a laser beam for the measurement of the plant growth information. However, the present invention is not limited to this. The growth information may alternatively be acquired with a satellite photograph, a drone with a sensor capable of measuring the growing conditions, or may be manually acquired by a worker on site.

The growth sensor device 10 illustrated in FIG. 1 further includes: a "clock 15" that generates time information; a "display 16" that is an example of a display unit configured to display various types of information; a various types of information input device 17 through which various types of information are input; and a "growth sensor device control unit 11" that controls the components such as the GPS device 12.

The growth sensor device control unit 11 also controls a "first various types of information storage section 20", a "second various types of information storage section 30", a "third various types of information storage section 40", and a "fourth various types of information storage section 50" illustrated in FIG. 1, FIG. 3 to FIG. 7 are schematic block diagrams, respectively illustrating the main configurations of the "first various types of information storage section 20", the "second various types of information storage section 30", the "third various types of information storage section 40", the "fourth various types of information storage section 50", and a "fifth various types of information storage section 60". These components, such as the storage section 20, are described in detail later.

The growth sensor device 10 illustrated in FIG. 1 includes a computer having unillustrated components, such as a central processing unit (CPU), a random access memory (RAM), and a read only memory (ROM), connected to each other through a bus or the like.

The present embodiment is described below based on an example where a user, owning farm fields (a farm field X and a farm field Y) that are farms for the plants P on both sides of a street B in a town A in Hokkaido, acquires information on the growing condition of the plants P while driving his or her tractor 1 illustrated in FIG. 2 in the farm field X and the farm field Y.

The user driving the tractor 1 in the farm field. X and the farm field Y operates the growth sensor device 10 in FIG. 1, in the manner illustrated in FIG. 2. Thus, the laser beam emitting device 13 of the growth sensor device 10 irradiates the plants P, in the same location, with the two laser beams with different wavelengths (the first measurement light beam (red) and the second measurement light beam (infrared)). During this process, the laser beam receiving unit 14 acquires the reflection light corresponding to each of the light beams, and stores the reflectance (red laser beam reflectance (R) and infrared laser beam reflectance (IR)) in a "reflectance storage section 21" illustrated in FIG. 3.

Figure 3:
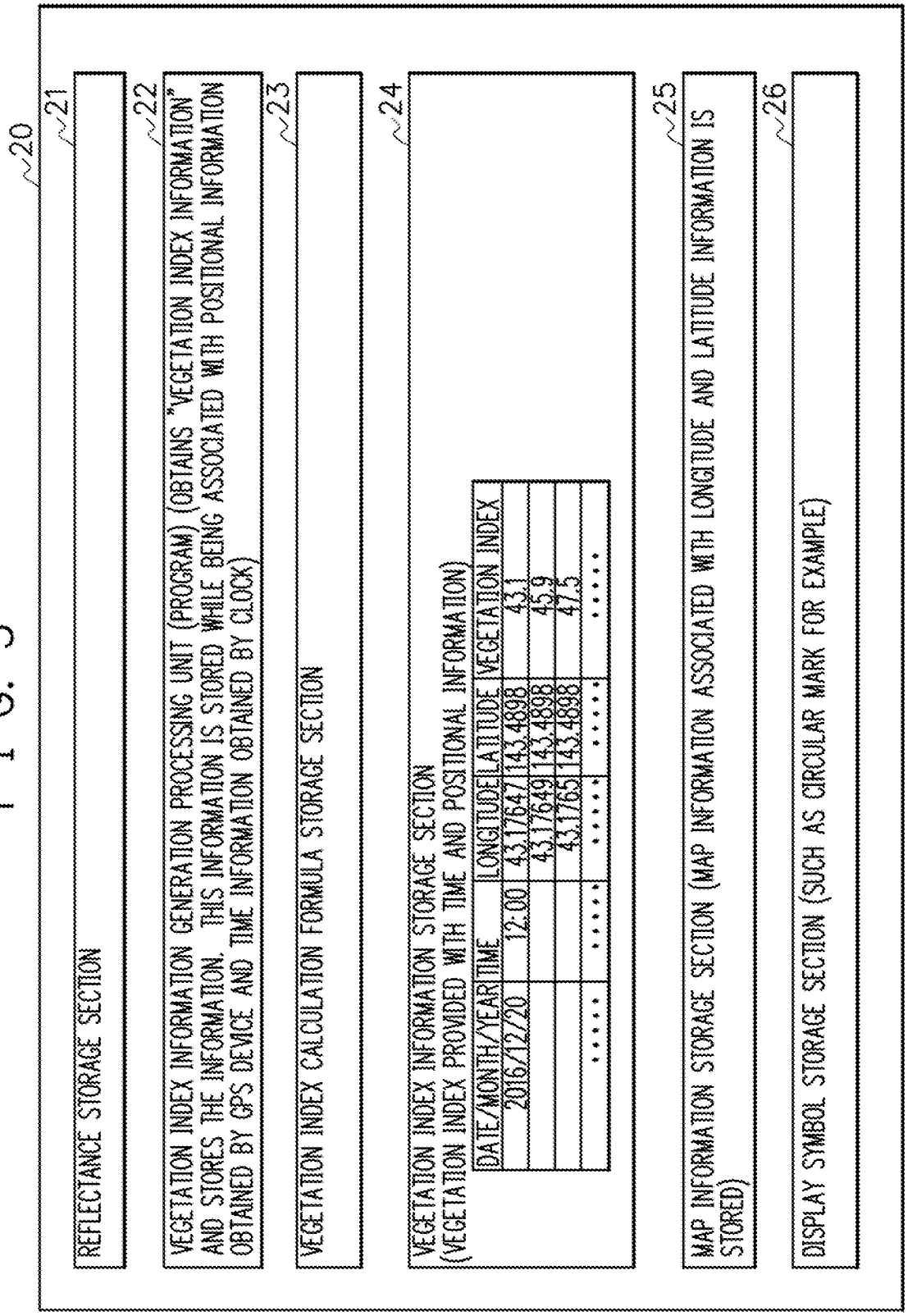
FIG. 3 is a schematic block diagram illustrating main configurations of a first various types of information storage section.

Then, a "vegetation index information generation processing unit (program) 22" illustrated in FIG. 3 operates, and refers to data in the "reflectance storage section 21" and a "vegetation index calculation formula storage section 23" illustrated in FIG. 3. For example, the "vegetation index calculation formula storage section 23" stores therein "vegetation index (NDVI=(IR−R)/(IR+R))". The vegetation index is indicative of the amount of nutrient and the like contained in the plant P and the like. Thus, the "vegetation index information generation processing unit (program) 22" operates to substitute the values of the reflectance described above in the calculation formula described above, whereby the vegetation index can be obtained. The method according to the present embodiment employs the vegetation index as an index indicating how well a plant is growing. Alternatively, a method employing any other index indicating the plant growing condition may be employed.

The "vegetation index" information thus obtained is stored in a "vegetation index information storage section 24" illustrated in FIG. 3 by the "vegetation index information generation processing unit (program) 22", while being associated with the positional information (the longitude and the latitude) indicating a location of the measurement and the time information indicating the time of the measurement respectively acquired from the GPS device 12 and the clock 15 illustrated in FIG. 1.

Thus, the "vegetation index" information, indicating the amount of nutrient, the information indicating the date/month/year (for example, Dec. 20, 2015) and the time (12:00) of the measurement, and the positional information indicating the longitude and the latitude are stored in the vegetation index information storage section 24 while being associated with each other.

The vegetation index information is acquired in the farm field X and in the farm field Y, and is collectively stored in the vegetation index information storage section 24 with no distinction between the farm field X and the farm field Y.

Processing of processing the "vegetation index information" illustrated in FIG. 3 thus acquired into information easy to check by the user with the distinction between the farm field X and the farm field Y is described below with reference to flowcharts in FIG. 8 to FIG. 10.

Figure 10:
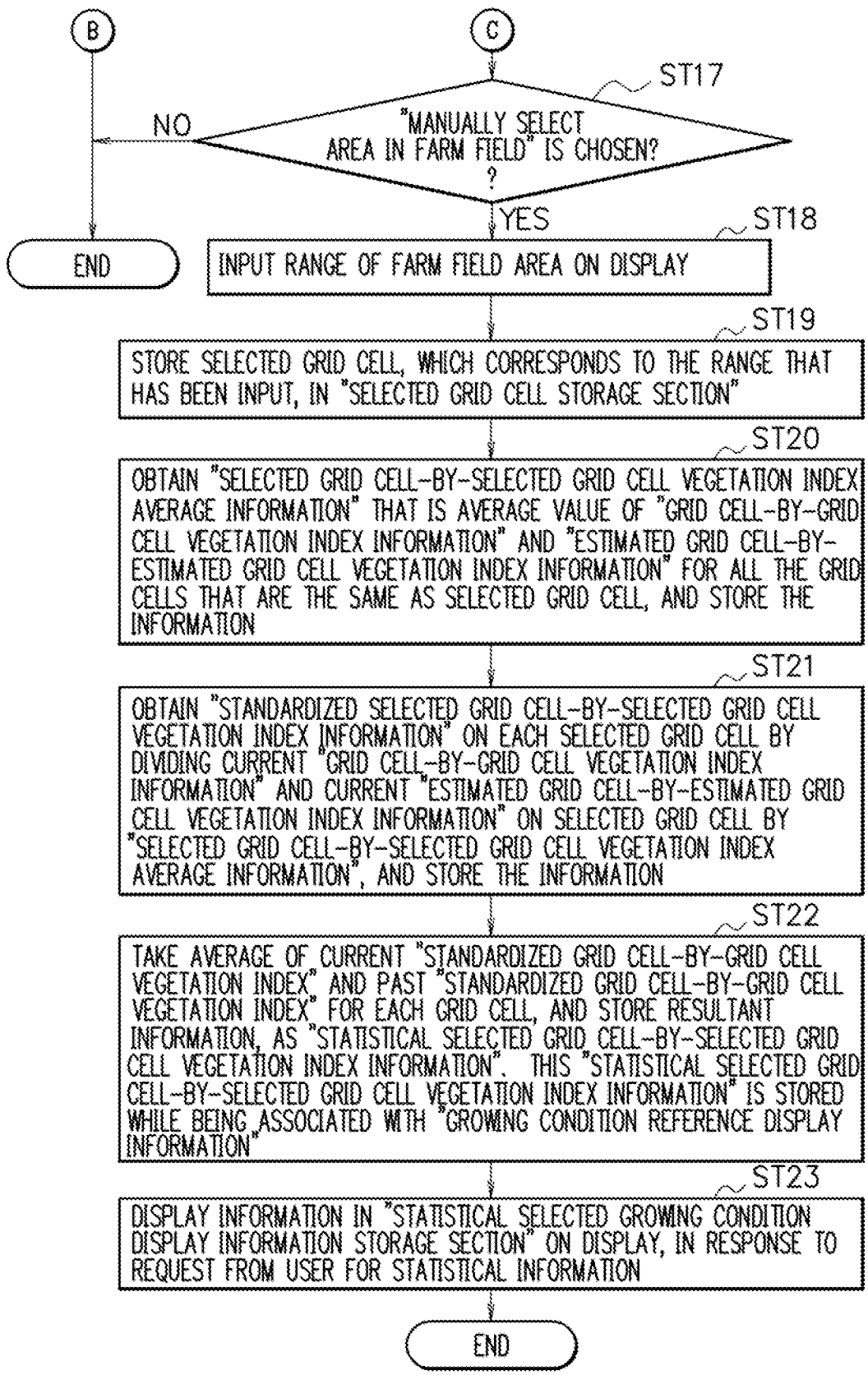
FIG. 10 is another schematic flowchart illustrating a process of displaying a growing condition on the display and other like processes.

FIG. 8 to FIG. 10 are schematic flowcharts illustrating a process of displaying the growing condition on the display 16 and other like processes. First of all, in step (hereinafter, referred to as "ST") 1 in FIG. 8, the user operates the various types of information input device 17 illustrated FIG. 1 to request the display 16 to display his or her farm field X and farm field Y.

Then, the processing proceeds to ST2. In ST2, a "first growth data display information generation processing unit (program) 31" in FIG. 4 operates with reference to a "map information storage section 25", the "vegetation index information storage section 24", and a "display symbol storage section 26" illustrated in FIG. 3 to provide a circular mark that is a display symbol to a location where the "vegetation index information" is acquired in map information, and store the resultant information, serving as "first growth data display information", in a "first growth data display information storage section 32" in FIG. 4.

Figure 11:
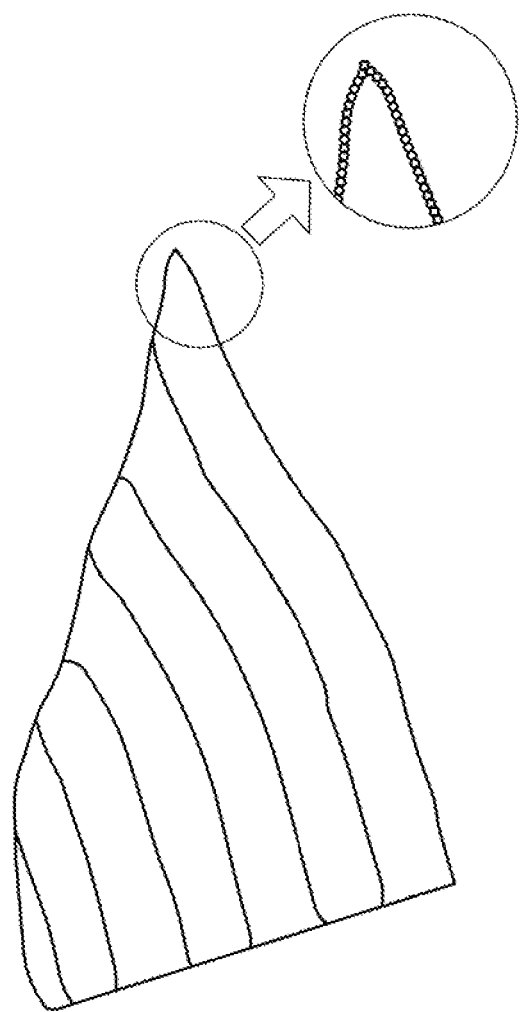
FIG. 11 is a schematic view illustrating "first growth data display information" with a circular mark provided to a location where vegetation index information is acquired in a farm field X in map information.

FIG. 11 is a schematic view illustrating the "first growth data display information" with the circular mark provided to a location where the vegetation index information is acquired in the farm field X in the map information. The location where the vegetation index information is acquired while the tractor 1 is traveling in the farm field X is provided with the circular mark as illustrated in FIG. 11.

Then, the processing proceeds to ST3. In ST3, a "grid-overlay first growth data display information generation processing unit (program) 33" illustrated in FIG. 4 operates with reference to a "grid information storage section 34" and the "first growth data display information storage section 32" in FIG. 4. The "grid information storage section 34" stores therein grid information representing a grid indicating a section for example. The grid information is combined with the first growth data display information, whereby "grid-overlay first growth data display information" is generated and is stored in a "grid-overlay first growth data display information storage section 35" in FIG. 4.

FIG. 12 is a schematic view of the "grid-overlay first growth data display information" obtained by combining the grid information with the farm field X in FIG. 11. As illustrated in FIG. 12, the grid-overlay first growth data display information is, generated with grid cells G stored while being combined with the "first growth data display information (circular mark)".

Then the processing proceeds to ST4. In ST4, whether there is the "first growth data display information (circular mark)" is determined for each grid cell, with reference to the "grid-overlay first growth data display information storage section 35" in FIG. 4. For example, a grid cell G1 illustrated in FIG. 12 includes a plurality of pieces of the "first growth data display information (circular mark)". Thus, it is determined in ST5 that the grid cell includes the "first growth data display information (circular mark)", and the processing proceeds to ST6.

In ST6, a "grid cell-by-grid cell vegetation index information generation processing unit (program) 36" operates to extract the "vegetation index information (for example, 43.1 or the like)", in the "vegetation index information storage section 24" in FIG. 3, corresponding to the "first growth data display information (circular mark)" in each of the grid cells determined to include the "first growth data display information (circular mark)", and to execute averaging processing for each grid cell.

Thus, through the processing, the "vegetation index information (for example, 43.1 or the like)" is averaged in each of the grid cells including the "first growth data display information (circular mark)", in all the grid cells illustrated in FIG. 12. The resultant averaged information is stored as "grid cell-by-grid cell vegetation index information" in a "grid cell-by-grid cell vegetation index information storage section 41" in FIG. 5.

Then, the processing proceeds to ST7. The processing proceeds to ST7, also when the "first growth data display information (circular mark)" is determined to be not included in a grid cell such as a grid cell G2 in FIG. 12, in ST5.

In ST7, an "estimated grid cell-by-estimated grid cell vegetation index information generation processing unit (program) 42" in FIG. 5 operates with reference to the "grid cell-by-grid cell vegetation index information storage section 41" in FIG. 5, and extracts the "grid cell-by-grid cell vegetation index information" related to grid cells within a predetermined range around the grid cell including no mark.

Then, for example, an averaged "vegetation index" is estimated for the grid cell including no mark, such as the grid cell G2 in FIG. 12 for example, through "Inverse Distance Weighting (IDW)" with which information on a grid cell, closer to the grid cell including no mark, is provided with a larger weight.

Specifically, the IDW is a method for interpolation in which an average value is estimated for a grid cell with no value, based on values obtained by weighted averaging with the weight being the inverse of the distance. With the "grid cell-by-grid cell vegetation index information" on a grid cell including no first growth data display information (circular mark) (such as the grid cell G2 in FIG. 12 for example) thus estimated, the "estimated grid cell-by-estimated grid cell vegetation index information" is generated and is stored in an "estimated grid cell-by-estimated grid cell vegetation index information storage section 43" in FIG. 5.

Then, the processing proceeds to ST8. In ST8, a "growing condition display information processing unit (program) 44" in FIG. 5 operates with reference to a "growing condition basic display information storage section 45", the "grid cell-by-grid cell vegetation index information storage section 41", and the "estimated grid cell-by-estimated grid cell vegetation index information storage section 43" in FIG. 5 and the "map information storage section 25" in FIG. 3.

The growing condition basic display information storage section 45 stores growing condition basic display information serving as an example of growth level information. For example, information for displaying grid cells, classified into "good", "normal", and "bad" depending on the averaged value therein, with "three-line hatching", "single-line hatching", and "no hatching" is stored.

In this processing, "growing condition display information" is generated with the "grid cell-by-grid cell vegetation index information" and the "estimated grid cell-by-estimated grid cell vegetation index information" associated with the "growing condition basic display information (good (three-line hatching), normal (single-line) hatching), and bad (no hatching))" and with the map information, based on the information in the "growing condition basic display information storage section 45", the "grid cell-by-grid cell vegetation index information storage section 41", the "estimated grid cell-by-estimated grid cell vegetation index information storage section 43", and the "map information storage section 25". The "growing condition display information" is stored in a "growing condition display information storage section 51" in FIG. 6.

Specifically, a corresponding one of values good, normal, and bad is determined for each averaged value (grid cell-by-grid cell vegetation index information) and the estimated value (estimated grid cell-by-estimated grid cell vegetation index information) of the grid cell, and "growing condition display information" indicating a corresponding one of the display modes (three-line hatching, single-line hatching, and no hatching) for the determined one of good, normal, and bad is stored in the "growing condition display information storage section 51".

FIG. 13 is a schematic view of information obtained by adding "growth information display information" to a value of each grid cell in the farm field X in FIG. 12. As illustrated in FIG. 13, grid cells of the grid cells G, in the farm field X, with nutrient contained in the plants determined to be "good" are displayed with three-line hatching. Grid cells with the nutrient contained in the plants determined to be "normal" are displayed with single-line hatching. Grid cells with the nutrient contained in the plants determined to be "bad" are displayed with no hatching.

Then, the processing proceeds to ST9. In ST9, an "independent farm field information processing unit (program) 52" in FIG. 6 operates with reference to the growing condition display information in the "growing condition display information storage section 51" to determine a boundary of a farm field. More specifically, a boundary R that is an outer line of the grid is set for the farm field X in FIG. 13. An area within the boundary R is labeled (for example, with "1") as an independent farm field (an example of independent farm field information), and is stored in an "independent farm field information storage section 53" in FIG. 6.

As described above, the "vegetation index information" is managed with farm fields automatically distinguished from each other by the growth sensor device 10. Thus, a user-friendly device omitting the need for a user owning a plurality of farm fields such as the farm field X and the farm field Y to individually manage data in each of the farm fields can be provided. The growth sensor device 10 automatically provides the growth information display (good, normal, and bad) related to the growing condition in each farm field. Thus, the user can easily manage the information individually for each farm field, and can easily create a fertilization plan for each farm field.

In the present embodiment, information for each grid cell displayed to the user may provide the growth information display mode (good, normal, and bad) on a region (having a predetermined area)-by-region basis instead of a point-by-point basis, to be more useful for the user.

The growth information display (good, normal, and bad) can be estimated for a grid cell without the vegetation index information. This configuration enables the user to easily create the fertilization plan.

Figure 14:
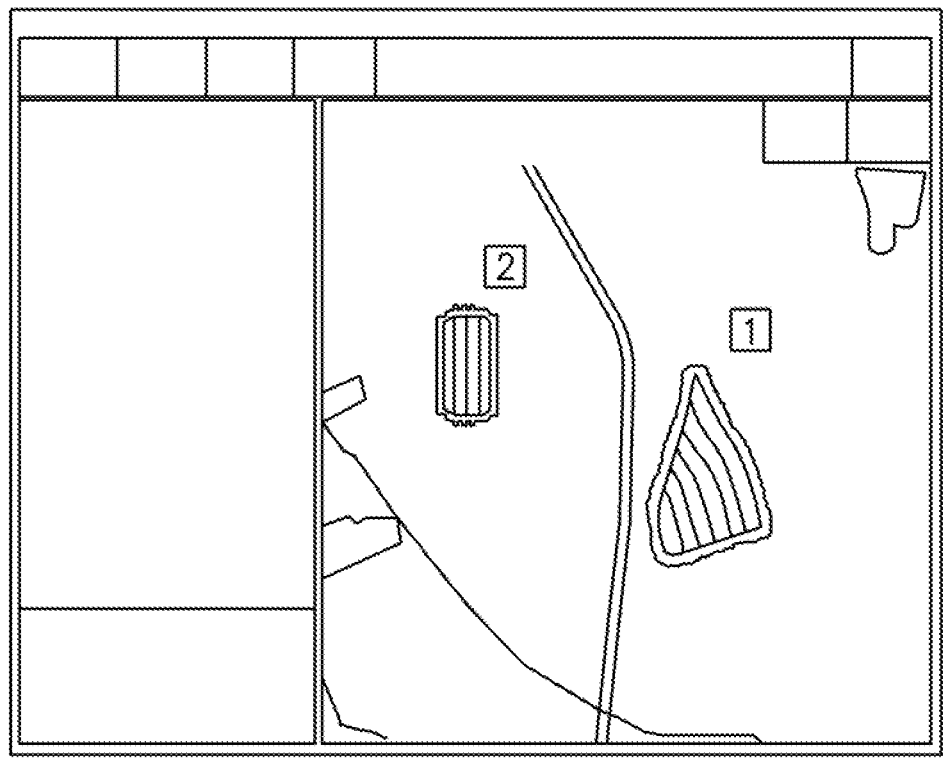
FIG. 14 is a schematic view illustrating a farm field X(1) and a farm field Y(2) of a user on both sides of a street, displayed as individual independent farm fields on the display.

Then, the processing proceeds to ST10. In ST10, the independent farm field information and the like as well as the map information are displayed on the display 16 with reference to the "independent farm field information storage section 53" in FIG. 6. FIG. 14 is a schematic view illustrating a farm field X(1) and a farm field Y(2) of the user on both sides of the street B, each individually displayed as an independent farm field on the display 16. Thus, in the present embodiment, the growth sensor device 10 automatically displays the plurality of farm fields X and Y separately from each other, even when the "vegetation index information" is not stored in a file or the like for each farm field. Thus, a user-friendly device can be provided.

In the screen illustrated in FIG. 14, each farm field is labeled. For example, the farm fields X and Y are respectively denoted with numbers "1" and "2".

In this processing, the display 16 also displays a selection screen enabling the user to choose automatic selection or manual selection of farm fields and farm field areas.

Then, when the automatic selection of farm fields is selected in ST11, the processing proceeds to ST12. In ST12, a farm field (for example, the farm field X denoted with "1") selected by the user clicking on the screen is stored as the selected farm field in a "selected farm field storage section 54" in FIG. 6.

For example, when the user selects the farm field X denoted with "1", the entire farm field X is determined to be selected, and is stored in the "selected farm field storage section 54".

Then, the processing proceeds to step ST13. In ST13, a "grid cell-by-grid cell vegetation index average information generation processing unit (program) 55" in FIG. 6 operates with reference to the "grid cell-by-grid cell vegetation index information storage section 41" and the "estimated grid cell-by-estimated grid cell vegetation index information storage section 43", to obtain "grid cell-by-grid cell vegetation index average information" as an average value of the "grid cell-by-grid cell vegetation index information" and the "estimated grid cell-by-estimated grid cell vegetation index information" on all the grid cells in the selected farm field (for example, the farm field X denoted with "1") in the "selected farm field storage section 54". The information thus obtained is stored in a "grid cell-by-grid cell vegetation index average information storage section 56". More specifically, the "grid cell-by-grid cell vegetation index average information" is average information on the vegetation indices of all the grid cells in the farm field X including the values obtained in the past.

Then, the processing proceeds to ST14. In ST14, a "standardized grid cell-by-grid cell vegetation index information generation processing unit (program) 57" operates to divide, for example, the current "grid cell-by-grid cell vegetation index information" and the current "estimated grid cell-by-estimated grid cell vegetation index information" on each grid cell, in the "grid cell-by-grid cell vegetation index information storage section 41" and the "estimated grid cell-by-estimated grid cell vegetation index information storage section 43", by the "grid cell-by-grid cell vegetation index average information", to obtain "standardized grid cell-by-grid cell vegetation index information" on each grid cell. The "standardized grid cell-by-grid cell vegetation index information" is stored in a "standardized grid cell-by-grid cell vegetation index information storage section 58". Thus, the "standardized grid cell-by-grid cell vegetation index information" is "standardized information" obtained through comparison between the current vegetation index information on the grid cells with the average vegetation index information on the grid cells in all the years, for the farm field X.

This processing is also executed on the "grid cell-by-grid cell vegetation index information" and the "estimated grid cell-by-estimated grid cell vegetation index information", on each grid cell in the farm field X, for each year in the past. With such processing, growth indices measured at different time points in the past can be compared with each other as relative values in the farm field.

Then, the processing proceeds to ST15. In ST15, a "statistical grid cell-by-grid cell vegetation index information processing unit (program) 59" operates to acquire the current and past "standardized grid cell-by-grid cell vegetation indices" in the "standardized grid cell-by-grid cell vegetation index information storage section 58" for each grid cell in the selected farm field (for example, the farm field X denoted with "1") in the selected farm field storage section 54, take an average of the current "standardized grid cell-by-grid cell vegetation index" and the past "standardized grid cell-by-grid cell vegetation index" for each grid cell, and store the resultant information as "statistical grid cell-by-grid cell vegetation index information" as an example of "statistical growth information" in a "statistical grid cell-by-grid cell vegetation index information storage section 61" in FIG. 7.

Thus, in this processing, not only the grid cell-by-grid cell vegetation index information at the current time point but also the information in the past within a predetermined period can be acquired for the farm field X Then, these pieces of information are averaged so that the statistical information that is more accurate information can be obtained. Thus, the user can create a fertilization plan with reference to accurate information.

Figure 6:
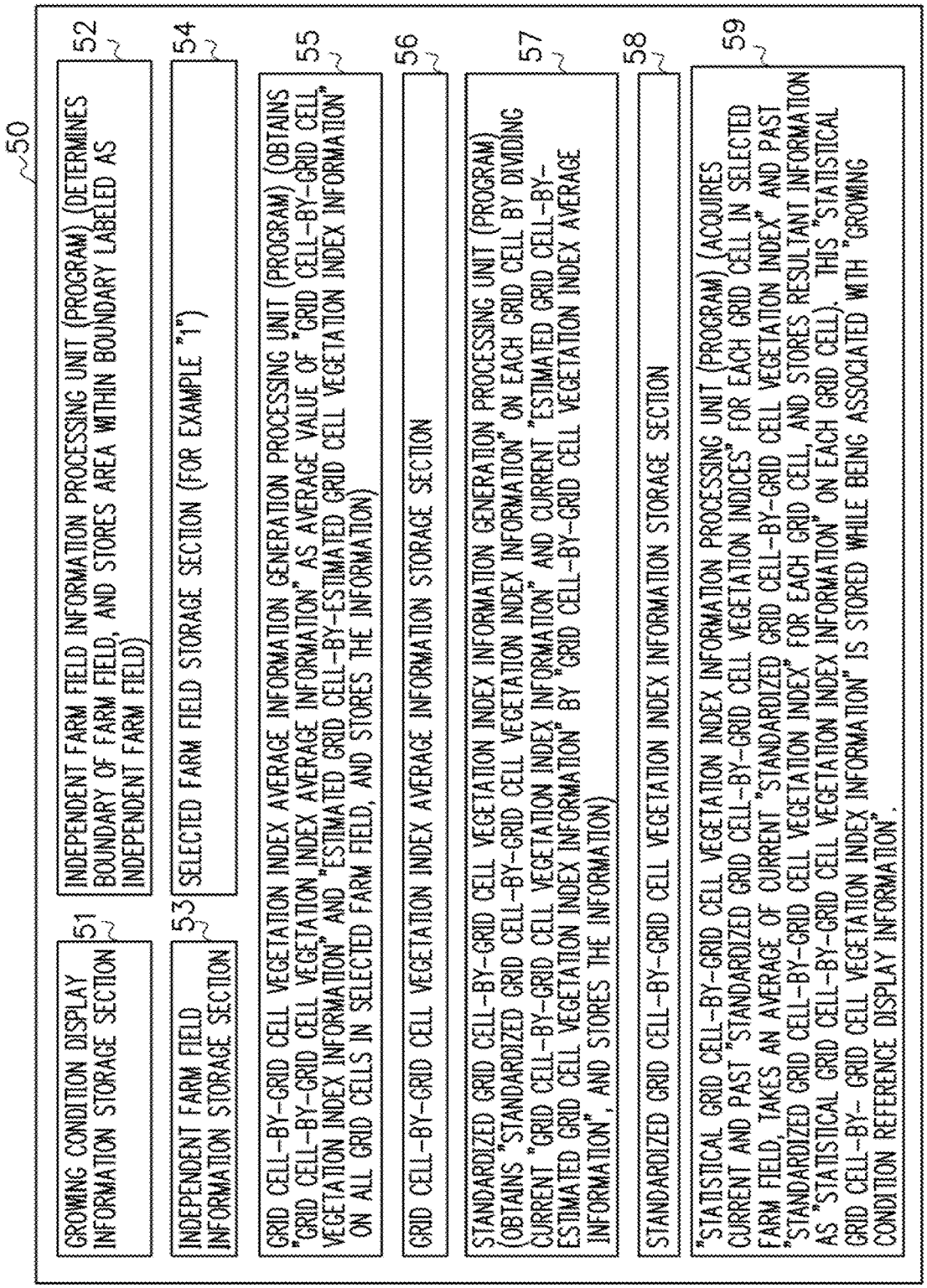
FIG. 6 is a schematic block diagram illustrating main configurations of a fourth various types of information storage section.
Figure 7:
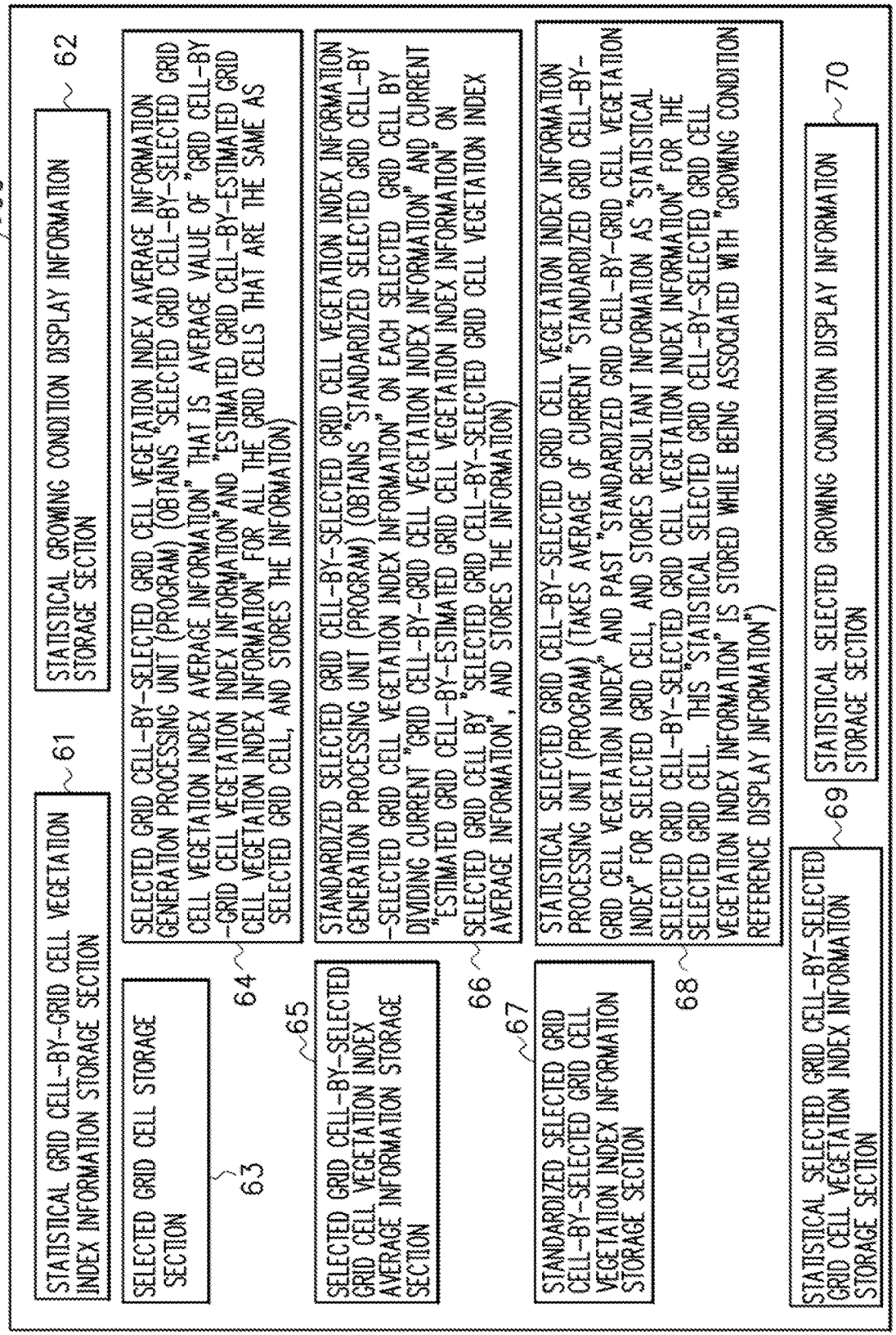
FIG. 7 is a schematic block diagram illustrating main configurations of a fifth various types of information storage section.

The accurate information is stored as the "statistical grid cell-by-grid, cell difference vegetation index information" in the "statistical grid cell-by-grid cell vegetation index information storage section 61" in FIG. 6 as described above. The "statistical grid cell-by-grid cell vegetation index information" is an example of statistical growth information.

This processing is also performed with reference to the "growing condition reference display information" in the "growing condition reference display information storage section 45", and the "statistical grid cell-by-grid cell vegetation index information" is stored in a "statistical growing condition display information storage section 62 while being associated with the "growing condition reference display information". More specifically, the "statistical grid cell-by-grid cell vegetation index information" is stored in the "statistical growing condition display information storage section 62", with each grid cell associated with the display mode indicating good, normal, or bad.

Then, the processing proceeds to ST16. In ST16, information in the "statistical growing condition display information storage section 62" is displayed on the display 16 in response to a request from the user for the statistical information. Specifically, the user who wants the "statistical information" not only including the current data but also including the past data to create a fertilization plan for the farm field X operates the various types of information input device 17 in FIG. 1 and inputs a request for displaying data (statistical growing condition display information) on the display 16.

Figure 15:
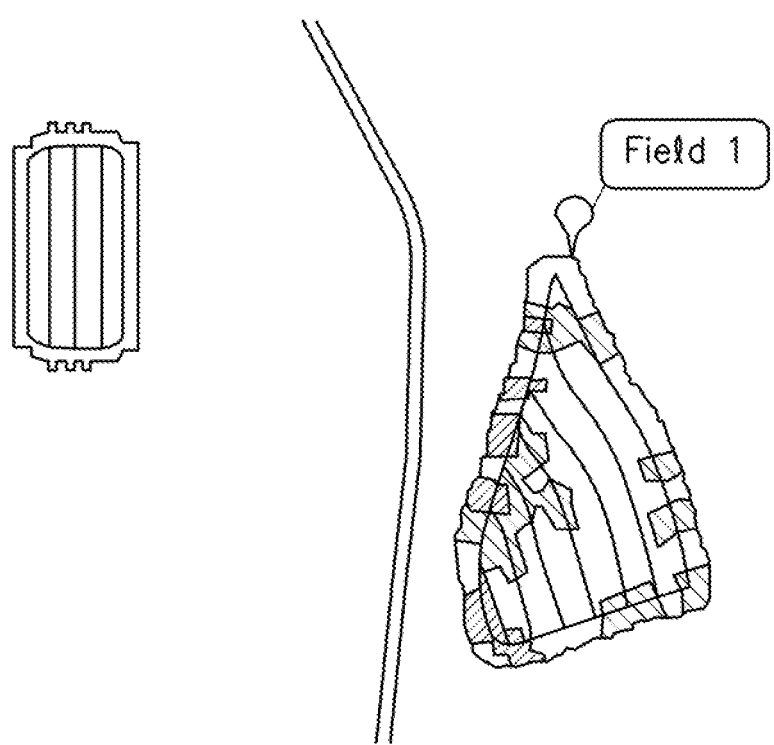
FIG. 15 is a schematic view of "standardized growing condition display information" on the farm field X displayed on the display.

FIG. 15 is a schematic view of the "statistical growing condition display information" on the farm field X displayed on the display 16. In FIG. 15, the selected farm field. X is illustrated as "Farm field_1", and the growing conditions of the grid cells indicating good, normal, and NA are respectively displayed with "three-line hatching", "single-line hatching", and "no hatching". Thus, the user viewing the display 16 can easily and clearly recognize the statistical information on the growing condition including the past data, and thus can easily create a fertilization plan for future use.

When "automatic select" is not selected in ST11, the processing proceeds to ST17. In ST17, when "manually select area in farm field" is chosen, the processing proceeds to ST18. In ST18, the user is requested to input a range of a farm field area on the display 16.

Figure 16:
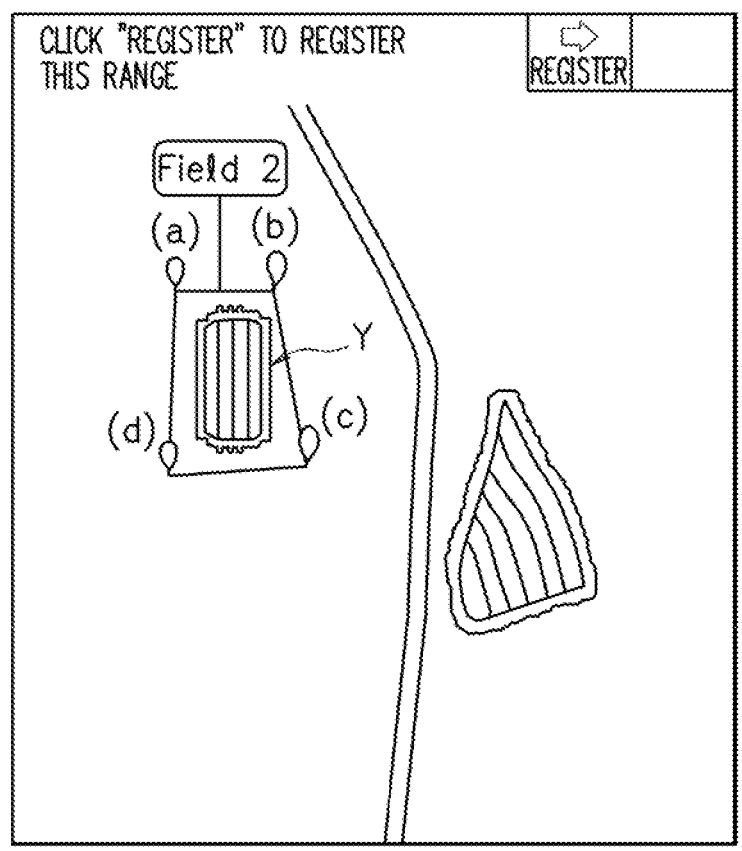
FIG. 16 is a schematic view of a state where a range of an area in the film field has been input by the user.

FIG. 16 is a schematic view of a state where a range of a film field area has been input by the user. In FIG. 16, the user has set a farm field area "Farm field_2", which is an example of a desired area, with four points (a), (b), (c), and (d).

Then, the processing proceeds to ST19. In ST19, a selected grid cell, which corresponds to the range (Farm field_2) that has been input, is stored in a "selected grid cell storage section 63" in FIG. 7. Specifically, a portion of the range "Farm field_2" that has been input including the grid cell of the farm field, that is, a portion of the grid cell in the "farm field Y" serving as the independent farm field in the example illustrated in FIG. 16, is stored in the "selected grid cell storage section 63" in FIG. 7.

Thus, in the present embodiment, as illustrated in FIG. 16, even when the user inputs a range including a portion outside the farm field, a portion including the grid cells in the farm field is automatically set as the target range. Thus, the user can easily perform the operation of set the range.

Then, the processing proceeds to ST20. In ST20, a "selected grid cell-by-selected grid cell vegetation index average information generation processing unit (program) 64" in FIG. 7 operates with reference to the "grid cell-by-grid cell vegetation index information storage section 41" and the "estimated grid cell-by-estimated grid cell vegetation index information storage section 42" in FIG. 5 to obtain "selected grid cell-by-selected grid cell vegetation index average information" that is an average value of the "grid cell-by-grid cell vegetation index information" and the "estimated grid cell-by-estimated grid cell vegetation index information" for all the grid cells in the "selected grid cell storage section 63" that are the same as the selected grid cell, and store the information thus obtained in a "selected grid cell-by-selected grid cell vegetation index average information storage section 65". Thus, the "selected grid cell-by-selected grid cell vegetation index average information" is average information on all the vegetation indices of grid cells corresponding to the selected grid cells including those in the past.

Then, the processing proceeds to ST21. In ST21, a "standardized selected grid cell-by-selected grid cell vegetation index information generation processing unit (program) 66" operates to divide the current "grid cell-by-grid cell vegetation index information" and the current "estimated grid cell-by-estimated grid cell vegetation index information" on the selected grid cell, in the "grid cell-by-grid cell vegetation index information storage section 41" and the "estimated grid cell-by-estimated grid cell vegetation index information storage section 42", by the "selected grid cell-by-selected grid cell vegetation index average information" described above. Thus, "standardized selected grid cell-by-selected grid cell vegetation index information" on each selected grid cell is obtained and stored in a "standardized selected grid cell-by-selected grid cell vegetation index information storage section 67".

Thus, the "standardized selected grid cell-by-selected grid cell vegetation index information" is "standardized information" obtained through comparison between the current vegetation index information on the selected grid cell with the average vegetation index information on the selected grid cell of all the measured years.

This processing is executed on the "grid cell-by-grid cell vegetation index information" and the "estimated grid cell-by-estimated grid cell vegetation index information", corresponding to the selected grid cell, for each year in the past. Through this processing, growth indices measured at different time periods in the past can be compared with each other as relative values in the selected grid cell farm field.

Then, the processing proceeds to ST22. In ST22, a "statistical selected grid cell-by-selected grid cell vegetation index information processing unit (program) 68" operates to acquire the current and past "standardized grid cell-by-grid cell vegetation indices", in the "standardized selected grid cell-by-selected grid cell vegetation index information storage section 67", corresponding to the selected grid cell in the "selected grid cell storage section 63", take an average of the current "standardized grid cell-by-grid cell vegetation index" and the past "standardized grid cell-by-grid cell vegetation index" for each grid cell, and store the resultant information as the "statistical selected grid cell-by-selected grid cell vegetation index information" which is an example of the "statistical growth information", in a "statistical selected grid cell-by-selected grid cell vegetation index information storage section 69".

This processing is executed with reference to the "growing condition reference display information" in the "growing condition reference display information storage section 45", and the "statistical selected grid cell-by-selected grid cell vegetation index information" is stored in a "statistical selected growing condition display information storage section 70" while being associated with the "growing condition reference display information". Specifically, the "statistical selected grid cell-by-selected grid cell vegetation index information" is stored in the "statistical selected growing condition display information storage section 70", with each grid cell associated with the display mode indicating good, normal, or bad.

Thus, the user can create a fertilization plan with reference to accurate information. In this processing, the user can select a desired range he or she needs, and thus can acquire information only on the required portion in a case where information on the entire farm field is not required.

Then, the processing proceeds to ST19. In ST23, the information in the "statistical selected growing condition display information storage section 70" is displayed on the display 16, in response to a request from the user for the standardized information. Specifically, the user who wants to acquire the "standardized information" not only including the current data but also including the past data for creating a fertilization plan for the farm field operates the various types of information input device 17 in FIG. 1 to input a request for displaying the data (statistical selected growing condition display information) on the display 16.

As a result, the growing conditions indicating good, normal, and bad for the grid cells in the farm field Y selected with "Farm field_2" are respectively displayed with "three-line hatching", "single-line hatching", and "no hatching" on the selected farm field Y in FIG. 16. Thus, the user viewing the display 16 can easily and clearly recognize the growing condition in the standardized information including the past data, and thus can easily create a fertilization plan for fixture use. The user who wants to obtain information on a portion of the thrill field instead of the entire farm field can set the desired range, whereby a user-friendly device can be provided.

The present invention may further include a configuration in which positional information on a farm field and the like of the user, a growing condition of plants, and the like are stored in a mobile terminal such as a smartphone of the user, and information such as the growing condition of the plants in the farm field or the like is displayed on a display of the mobile terminal when the user holding the mobile terminal approaches the registered farm field.

Furthermore, a configuration in which the name of the crops, the seeding date and time, the fertilizing date and time, and the like can be displayed on a display together with the growing condition in the farm field may be employed.

The present invention is not limited to the embodiment described above.

EXPLANATION OF REFERENCE NUMERALS

1 . . . tractor, 10 . . . growth sensor device, 11 . . . growth sensor device control unit, 12 . . . GPS device, 13 . . . laser beam emitting device, 14 . . . laser beam receiving unit, 15 . . . clock, 16 . . . display, 17 . . . various types of information input device, 20 . . . first various types of information storage section, 21 . . . reflectance storage section, 22 . . . vegetation index information generation processing unit (program), 23 . . . vegetation index calculation formula storage section, 24 . . . vegetation index information storage section, 25 . . . map information storage section, 26 . . . display symbol storage section, 30 . . . second various types of information storage section, 31 . . . first growth data display information generation processing unit (program), 32 . . . first growth data display information storage section, 33 . . . grid-overlay first growth data display information generation processing unit (program), 34 . . . grid information storage section, 35 . . . grid-overlay first growth data display information storage section, 36 . . . grid cell-by-grid cell vegetation index information generation processing unit (program), 40 . . . third various types of information storage section, 41 . . . grid cell-by-grid cell vegetation index information storage section, 42 . . . estimated grid cell-by-estimated grid cell vegetation index information generation processing unit (Program), 43 . . . estimated grid cell-by-estimated grid cell vegetation index information storage section, 44 . . . growing condition display information processing unit (program), 45 . . . growing condition basic display information storage section, 50 . . . fourth various types of information storage section, 51 . . . growing condition display information storage section, 52 . . . independent farm field information processing unit (program), 53 . . . independent farm field information storage section, 54 . . . selected farm field storage section, 55 . . . grid cell-by-grid cell vegetation index average information generation processing unit (program), 56 . . . grid cell-by-grid cell vegetation index average information storage section, 57 . . . standardized grid cell-by-grid cell vegetation index information generation processing unit (program), 58 . . . standardized grid cell-by-grid cell vegetation index information storage section, 59 . . . statistical grid cell-by-grid cell vegetation index information processing unit (program), 60 . . . fifth various types of information storage section, 61 . . . statistical grid cell-by-grid cell vegetation index information storage section, 62 . . . statistical growing condition display information storage section, 63 . . . selected grid cell storage section, 64 . . . selected grid cell-by-selected grid cell vegetation index average information generation processing unit (program), 65 . . . selected grid cell-by-selected grid cell vegetation index average information storm section, 66 . . . standardized selected grid cell-by-selected grid cell vegetation index information generation processing unit (program), 67 . . . standardized selected grid cell-by-selected grid cell vegetation index information storage section, 68 . . . statistical selected grid cell-by-selected grid cell vegetation index information processing unit (program), 69 . . . statistical selected grid cell-by-selected grid cell vegetation index information storage section, 70 . . . statistical selected growing condition display information storage section,
P . . . plant

What is claimed is:

1. A growth information management device comprising:
 a processor;
 a display unit; and
 a memory, for storing computer program instructions, which when executed by the processor, cause the processor to perform operations comprising:
  associating measured growth information, which is plant growth information on a farm field that has been measured, with a location on the farm field where the plant growth information is measured;
  combining map information of the farm field with grid information;
  combining the grid information with the measured growth information;
  generating averaged information in each of a plurality of grid cells by averaging the measured growth information in each of the plurality of grid cells;
  with respect to particular ones of the plurality grid cells not including the measured growth information, estimating growth information for the particular ones of the plurality grid cells on the basis of the measured growth information from one or more other ones of the plurality of grid cells that are closer to the particular ones of the plurality of grid cells not including the measured growth information;
  determining a boundary of the farm field using an outer line of the plurality of grid cells including the measured growth information and the particular ones of the plurality of grid cells having the estimated growth information;
  identifying particular grid cells in an area within the boundary as an independent farm field;
  converting the measured growth information corresponding to the independent farm field into growth level information that is information indicating a level of growth of a plant; and
  displaying the growth level information on the display unit.

2. The growth information management device according to claim 1, wherein the operations further comprise:
 generating standardized grid cell-by-grid cell measured growth information by dividing the measured growth information from each of the plurality of grid cells for a current year and past years and the estimated growth information on each of the particular ones of the plurality grid cells by averaged measured growth information including the measured growth information in the past years for all the particular grid cells in the independent farm field.

3. The growth information management device according to claim 2, wherein the operations further comprise:
 generating statistical grid cell-by-grid cell measured growth information by averaging current standardized grid cell-by-grid cell measured growth information and past standardized grid cell-by-grid cell measured growth information for each of the particular grid cells in the independent farm field.

4. The growth information management device according to claim 3, wherein either the standardized grid cell-by-grid cell measured growth information or the statistical grid cell-by-grid cell measured growth information is generated only for a desired area in the independent farm field.

5. The growth information management device according to claim 4, wherein when all the particular grid cells in the independent farm field are selected as a range, any grid cells having the measured growth information within that selected range are associated as part of the independent farm field.

6. The growth information management device according to claim 3, wherein when all the particular grid cells in the independent farm field are selected as a range, any grid cells having the measured growth information within that selected range are associated as part of the independent farm field.

7. The growth information management device according to claim 1, wherein when all the particular grid cells in the independent farm field are selected as a range, any grid cells having the measured growth information within that selected range are associated as part of the independent farm field.

8. A method for controlling a growth information management device, the method comprising:
associating measured growth information, which is plant growth information on a farm field that has been measured, with a location on the farm field where the plant growth information is measured;
combining map information of the farm field with grid information;
combining the grid information with the measured growth information;
generating averaged information in each of a plurality of grid cells by averaging the measured growth information in each of the plurality of grid cells;
with respect to particular ones of the plurality grid cells not including the measured growth information, estimating growth information for the particular ones of the plurality grid cells on the basis of the measured growth information from one or more other ones of the plurality of grid cells that are closer to the particular ones of the plurality of grid cells not including the measured growth information;
determining a boundary of the farm field using an outer line of the plurality of grid cells including the measured growth information and the particular ones of the plurality of grid cells having the estimated growth information;
identifying an area within the boundary as independent farm field information;
converting the measured growth information corresponding to the independent farm field information into growth level information that is information indicating a level of growth of a plant; and
displaying the growth level information on a display unit.

9. A non-transitory computer-readable medium storing computer program instructions for managing measured growth information, which, when executed on a processor, cause the processor to perform operations comprising:
associating measured growth information, which is plant growth information on a farm field that has been measured, with a location on the farm field where the plant growth information is measured;
combining map information of the farm field with grid information;
combining the grid information with the measured growth information;
generating averaged information in each of a plurality of grid cells by averaging the measured growth information in each of the plurality of grid cells;
with respect to particular ones of the plurality grid cells not including the measured growth information, estimating growth information for the particular ones of the plurality grid cells on the basis of the measured growth information from one or more other ones of the plurality of grid cells that are closer to the particular ones of the plurality of grid cells not including the measured growth information;
determining a boundary of the farm field using an outer line of the plurality of grid cells including the measured growth information and the particular ones of the plurality of grid cells having the estimated growth information;
identifying an area within the boundary as independent farm field information;
converting the measured growth information corresponding to the independent farm field information into growth level information that is information indicating a level of growth of a plant; and
displaying the growth level information on a display unit.

* * * * *

UNITED STATES PATENT AND TRADEMARK OFFICE
CERTIFICATE OF CORRECTION

PATENT NO. : 10,548,261 B2
APPLICATION NO. : 15/705404
DATED : February 4, 2020
INVENTOR(S) : Ryosuke Tomizawa et al.

It is certified that error appears in the above-identified patent and that said Letters Patent is hereby corrected as shown below:

In the Specification

Column 2, Line 13, "the growth level information is determined far each of" should read --the growth level information is determined for each of--;

Column 2, Line 36, "The above-described object is achieved accord in to" should read --The above-described object is achieved according to--;

Column 3, Lines 58-59, "a range of an area in the film field" should read --range of an area in the farm field--;

Column 10, Line 52, "the grid cells indicating good, normal, and NA are" should read --the grid cells indicating good, normal, and bad are--;

Column 10, Line 65, "FIG. 16 is a schematic view of a state where a range of a film field" should read --FIG. 16 is a schematic view of a state where a range of a farm field--;

Column 12, Line 53, "easily create a fertilization plan for fixture use" should read --easily create a fertilization plan for future use--;

Column 12, Line 55, "obtain information on a portion of the thrill field instead" should read --obtain information on a portion of the farm field instead--.

Signed and Sealed this
Twenty-first Day of July, 2020

Andrei Iancu
*Director of the United States Patent and Trademark Office*